United States Patent Office 3,076,797
Patented Feb. 5, 1963

3,076,797
PROCESS OF PRODUCING OXYTOCIN AND INTERMEDIATES OBTAINED THEREBY
Leon Velluz, Paris, Gaston Amiard, Noisy-le-Sec, and René Heymes, Romainville, France, assignors to Roussel-UCLAF Societe Anonyme, a corporation of France
No Drawing. Filed July 16, 1958, Ser. No. 748,806
Claims priority, application France July 22, 1957
4 Claims. (Cl. 260—112)

The present invention relates to a new process of producing oxytocin, a nonapeptide hormone, and to products obtained thereby as intermediates.

Oxytocin corresponds to the formula given by Du Vigneaud et al. in J. Am. Chem. Soc., vol. 76, p. 3115 (1954), as follows

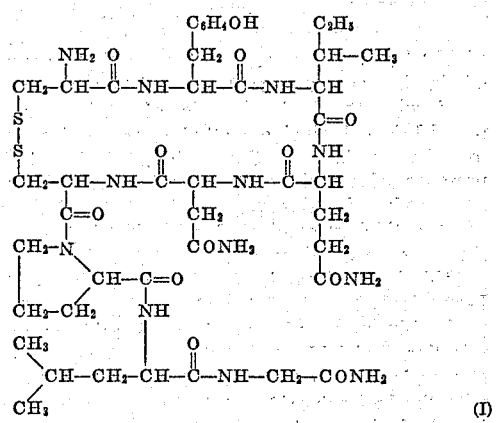

(I)

In copending application Serial No. 649,520, filed March 29, 1957, now U.S. Patent No. 2,938,891, and entitled "Method of Making Oxytocin and Intermediates Thereof," a process of preparing oxytocin is described which consists in treating the (S,N-ditrityl-L-cysteinyl)-L-tyrosyl-L-isoleucyl-(γ-methyl-L-glutamyl) - (β-methyl-L-aspartyl)-(S-trityl-L-cysteinyl)-L-prolyl-L-leucyl glycine methyl ester with ammonia in the presence or absence of a solvent and isolating the resulting (S,N-ditrityl-L-cysteinyl)-L-tyrosyl-L-isoleucyl-L-glutaminyl - L - asparaginyl-(S-trityl-L-cysteinyl)-L-prolyl-L-leucyl glycine amide. Said amide is then subjected to the action of an acid agent in a suitable solvent and in the presence or absence of water and of a catalyst. If necessary, the resulting L-cysteinyl-L-tyrosyl-L - isoleucyl - L - glutaminyl-L-asparaginyl-L-cysteinyl-L-prolyl-L-leucyl glycine amide is isolated and is finally oxidized in aqueous solution by means of oxygen so as to produce a nonapeptide hormone compound showing the activity of oxytocin. The (S,N-ditrityl-L-cysteinyl)L-tyrosyl-L-isoleucyl-(γ-methyl - L - glutamyl)-(β-methyl-L-aspartyl)-(S-trityl-L-cysteinyl)-L-prolyl - L - leucyl glycine methyl ester which is used as starting material in said process, is obtained as described in the above mentioned copending application by condensation of (S,N-ditrityl-L-cysteinyl)-L-tyrosyl-L-isoleucine with (γ-methyl-L-glutamyl)-(β-methyl - L - aspartyl)-(S-trityl - L - cysteinyl)-L-propyl-L-leucyl glycine methyl ester in the presence of dicyclohexyl carbodiimide. This process has a number of disadvantages and the yields of the final product are rather low.

It is one object of the present invention to provide an improved process of producing oxytocin in a high yield and of a high quality which process is free of the disadvantages of the prior art processes.

Another object of the present invention is to provide valuable new starting materials and intermediates useful in said new and improved process of producing oxytocin.

These and other objects of the present invention and advantageous features thereof will become apparent as the description proceeds.

In principle, the present invention consists in proceeding according to the flow sheet given hereinafter.

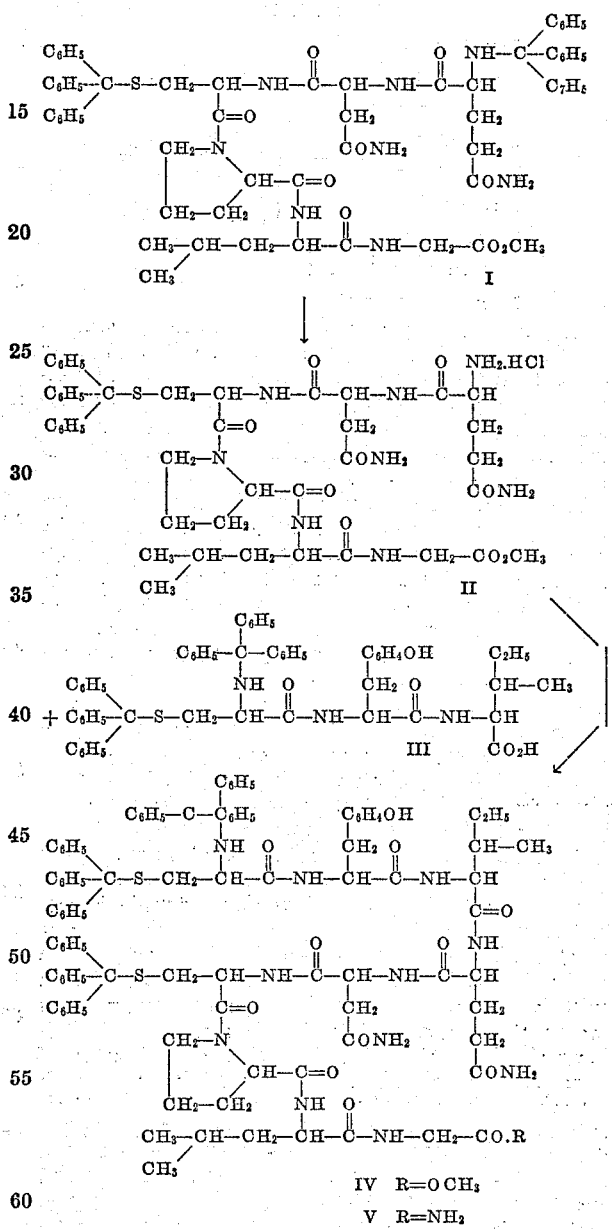

IV R=OCH₃
V R=NH₂

The new synthetic process of producing oxytocin according to the present invention may also be illustrated by the following diagram A whereby only the amino acids comprising oxytocin and the order in which they are condensed with each other, but not the actual manner in which such condensation is effected, are illustrated:

DIAGRAM A

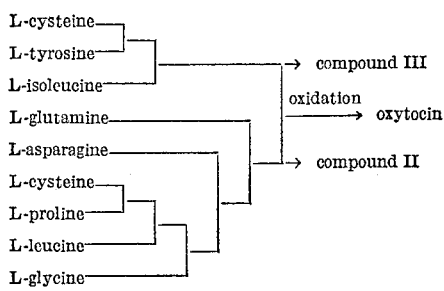

Another embodiment of the present invention wherein the preparation of compound II is effected in a somewhat different manner, as illustrated in Diagram A, is shown in the following Diagram B:

DIAGRAM B

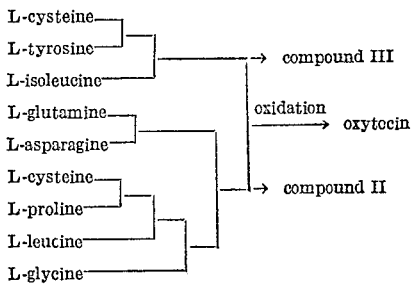

In principle, the process according to the present invention consists in selectively splitting the N-trityl group of (N-trityl-L-glutaminyl)-L-asparaginyl-(S-trityl-L-cysteinyl)-L-prolyl-L-leucyl glycine methyl ester of Formula I to yield the compound of Formula II which is then reacted with (S,N-ditrityl-L-cysteinyl)-L-tyrosyl-L-isoleucine of Formula III.

The process of producing oxytocin according to the present invention is of considerable advantage over the heretofore known processes. For instance, the hexapeptide of Formula I is more readily obtainable than (γ-methyl-L-glutamyl)-(β-methyl-L-asparaginyl) - (S-trityl-L-cysteinyl)-L-prolyl-L-leucyl glycine methyl ester.

According to another advantage of the process according to the present invention only one ester group need be converted into an amido group while three ester groups had to be subjected to ammonolysis when proceeding according to the process described in the above cited copending application Serial No. 649,520. As a result thereof, the yield when following the procedure according to the present invention is considerably higher and the resulting hormone oxytocin is of a much better quality.

According to the present invention, oxytocin is prepared by treating the (N-trityl-L-glutaminyl)-L-asparaginyl-(S-trityl-L-cysteinyl) - L - prolyl - L - leucyl glycine methyl ester of Formula I with hydrochloric acid in a suitable solvent. After washing the reaction mixture in the usual manner, L-glutaminyl-L-asparaginyl-(S-trityl-L-cysteinyl)-L-prolyl-L-leucyl glycine methyl ester of Formula II is isolated. Said compound is reacted with the mixed anhydride of ethyl carbonic acid and (S,N-ditrityl-L-cysteinyl)-L-tyrosyl-L-isoleucine of Formula III; the resulting (S,N-ditrityl-L-cysteinyl)-L-tyrosyl-L-isoleucyl - L - glutaminyl - L - asparaginyl - (S - trityl - L-cysteinyl)-L-prolyl-L-leucyl glycine methyl ester of Formula IV is isolated and ammonolyzed, detritylated by means of about 50% acetic acid, and oxidized by means of suitable oxidizing agents. Thereby the nonapeptide hormone described by Du Vigneaud is obtained.

According to a preferred embodiment of the present invention, (N-trityl-L-glutaminyl)-L-asparaginyl-(S-trityl-L-cysteinyl)-L-prolyl-L-leucyl glycine methyl ester of Formula I is selectively detritylated at the nitrogen atom by means of hydrochloric acid in acetone containing acetic acid. Condensation of the mixed anhydride of ethyl carbonic acid and (S,N-ditrityl-L-cysteinyl)-L-tyrosyl-L-isoleucine of Formula III with the L-glutaminyl-L - asparaginyl - (S - trityl - L - cysteinyl) - L - prolyl-L-leucyl glycine methyl ester of Formula II is carried out in aqueous chloroform. The resulting (S,N-ditrityl-L-cysteinyl) - L - tyrosyl - L - isoleucyl - L - glutaminyl-L-asparaginyl-(S-trityl-L-cysteinyl)-L-prolyl - L - leucyl glycine methyl ester of Formula IV is finally ammonolyzed by treatment with ammonia in methanol at a temperature between about —10° C. and room temperature.

(N - trityl - L - glutaminyl) - L - asparaginyl - (S-trityl - L - cysteinyl)-L-prolyl-L-leucyl glycine methyl ester used as starting material may be prepared according to copending application Serial No. 748,801, filed on July 16, 1958, Patent No. 3,014,022 and entitled "N-Trityl Peptides and a Process of Producing Same," by reacting asparagine monohydrate with trityl chloride in ether in the presence of triethylamine, hydrolyzing the resulting N-trityl asparagine trityl ester in order to obtain N-trityl asparagine or, respectively, hydrogenolyzing said N-trityl asparagine trityl ester in the presence of diethylamine in order to obtain the diethylamine salt of N-trityl asparagine. Said N-triethyl asparagine diethylamine salt and said N-trityl-L-asparagine are reacted with the hydrochloride of S-trityl-L-cysteinyl-L-prolyl-L-leucyl glycine methyl ester obtained according to Velluz et al., "Bull. Soc. Chim.," 1956, p. 1464, in the presence of dicyclohexyl carbodiimide. The condensation product is selectively detritylated and the resulting pentapeptide is condensed with N-trityl glutamine in the presence of dicyclohexyl carbodiimide.

(N-Trityl-L-glutaminyl) - L - asparaginyl - (S - trityl-L-cysteinyl)-L-prolyl-L-leucyl glycine methyl ester is preferably prepared according to said copending application Serial No. 748,807 by condensation of the diethylamine salt of (N-trityl-L-glutaminyl)-L-asparagine with the hydrochloride of S-trityl-L-cysteinyl-L-prolyl-L-leucyl glycine methyl ester in the presence of dicyclohexyl carbodiimide in methylene chloride. Thereby the hexapeptide is obtained in an excellent yield.

The following examples serve to illustrate the present invention without, however, limiting the same thereto. More particularly, the nature of the solvents and of the reagents, temperaure and duration of the reacation, the order of introducing the reagents into the reaction vessel may be varied by those skilled in the art in accordance with the principles set forth herein and in the claims annexed hereto. It is, of course, also possible to use other methods of condensing the hexapeptide of Formula II with the tripeptide of Formula III than by means of the mixed anhydride with ethyl carbonic acid.

The melting points given in the examples are instantaneous melting points determined on the Maquenne block.

EXAMPLE 1

*Preparation of the L-Glutaminyl-L-Asparaginyl-(S-Trityl-L-Cysteinyl) - L - Prolyl - L - Leucyl Glycine Methyl Ester (Formula II). (Method A)*

(a) *Preparation of the N-trityl - L - asparagine trityl ester.*—12 g. of trityl chloride are dissolved in 70 cc. of ether and added to a solution of 1 g. of the monohydrate of L-asparagine in 25 cc. of water and 7 cc. of triethylamine. The mixture is stirred for 3½ hours at 0° C. and, thereafter, is rendered slightly acid by the addition of dilute hydrochloric acid. The precipitate is filtered off, washed with water and then with ether. It is recrystallized from a mixture of benzene and ether (1:5). The yield is 83% of the theoretical amount. The compound melts at 218–222° C. and has a rotatory power of $[\alpha]_D^{20} = -64° \pm 2°$ (concentration: 2% in chloroform). The compound is insoluble in water and ether, soluble in alcohol, acetone, benzene, chloroform, and ethyl acetate.

*Analysis.*—$C_{42}H_{36}O_3N_2 = 616.7$. Calculated: 81.8% C; 5.9% H; 7.8% O; 4.5% N. Found: 81.7% C; 6.0% H; 7.6% O; 4.7% N.

(b) *Preparation of the N-trityl-L-asparagine benzyl ester.*—66 cc. of N potassium hydroxide solution are gradually added in small portions within 30 minutes to a boiling solution of 33.3 g. of N-trityl-L-aspartic acid dibenzyl ester obtained according to Velluz et al., Bull. Soc. Chim., 1956, p. 1464, in 180 cc. of dioxane and 30 cc. of water. 15 minutes after said addition, the dioxane is removed by distillation in a vacuum. The resulting solution is diluted with water, rendered acid by the addition of 70 cc. of N hydrochloric acid, and extracted with methylene chloride. The extracts are washed with water, dried over sodium sulfate, and concentrated by evaporation to a volume of about 100 cc. Gaseous ammonia is passed through the solution until the pH is between 8.0 and 9.0. 16 g. of dicyclohexyl carbodiimide are added to the mixture, the pH of which is maintained between about 8.0 and 9.0 by passing a slow stream of ammonia therethrough. After 2 hours, the precipitated dicyclohexyl urea (12.4 g., corresponding to 71) is filtered off and the solvent is distilled off in a vacuum at 30° C. The residue is taken up with methanol and the crystals are filtered with suction. The yield is 12 g. (43% of the theoretical amount) of N-trityl-L-asparagine benzyl ester which, after recrystallization from absolute alcohol, melts at 166–167° C. and has a rotatory power of $[\alpha]_D^{20} = -5° \pm 1°$ (concentration: 2% in chloroform). The compound is insoluble in water, slightly soluble in alcohol and ether, and soluble in chloroform.

*Analysis.*—$C_{30}H_{28}O_3N_2 = 464.5$. Calculated: 77.55% C; 6.0% H; 10.3% O; 6.0% N. Found: 77.3% C; 6.1% H; 10.7% O; 6.1% N.

(c) *Preparation of N-trityl-L-aspargine by hydrolysis of N-trityl-L-aspargine trityl ester.*—10 cc. of water and 5 cc. of pyridine are added to a solution of 10 g. of N-trityl-L-asparagine trityl ester obtained according to Example 1a, in 200 cc. of acetone. The mixture is allowed to stand for one night at room temperature and the acetone is removed by distillation at 40° C. in a vacuum. The oily residue is taken up with 50 cc. of water and 50 cc. of ether and the pH of the mixture is rendered slightly acid by the addition of N hydrochloric acid. The precipitated hydrated N-trityl-L-asparagine (5.2 g., corresponding to 85% of the theoretical amount) is filtered off and recrystallized from methyl ethyl ketone. It has a melting point of 194–196° C. and a rotatory power of $[\alpha]_D^{20} = -7°$ (concentration: 2% in methanol). (Zervas and Theodoropoulos, J. Am. Chem. Soc., vol. 78, p 1359 (1956), give a melting point of 173–174° C. and a rotatory power of $[\alpha]_D^{20} = -6.1°$ (concentration: 3.5% in methanol)). The compound is insoluble in ether, water, and benzene, slightly soluble in chloroform, and soluble in alcohol and acetone.

(d) *Preparation of N-trityl-L-asparagine by hydrogenolysis of N-trityl-L-asparagine benzyl ester.*—2 g. of the N-trityl-L-asparagine benzyl ester obtained as described in Example 1b, are subjected to the action of hydrogen in 40 cc. of ethyl acetate under atmospheric pressure at room temperature and in the presence of 0.5 g. of palladium precipitated on charcoal and 0.6 cc. of triethylamine. After separation of the catalyst from the reaction mixture by filtration, the solution is stirred with 15 cc. of 0.3 N hydrochloric acid. Thereby, 1.3 g. (80% of the theoretical amount) of hydrated N-trityl-L-asparagine are obtained.

(e) *Preparation of the diethylamine salt of N-trityl-L-asparagine.*—15 g. of the N-trityl-L-asparagine trityl ester obtained according to Example 1a, are subjected to the action of hydrogen in 150 cc. of absolute alcohol at room temperature and under atmospheric pressure in the presence of palladium precipitated on charcoal and of 3 cc. of diethylamine. After separation of the catalyst by filtration, the solution is concentrated by evaporation to a volume of 10 cc. 0.5 cc. of diethylamine are added thereto and the desired salt is precipitated by the addition of 200 cc. of ether. 9.85 g. (90% of the theoretical amount) of the diethylamine salt of N-trityl-L-asparagine are obtained. The compound melts at 152–155° C. and has a rotatory power of $[\alpha]_D^{20} = -29° \pm 2°$ (concentration: 1% in chloroform). (Zervas and Theodoropoulos, J. Am. Chem. Soc., vol. 78, p. 1359 (1956) give a melting point of 150–151° C.) The compound is insoluble in ether, slightly soluble in acetone, and soluble in water, alcohol, chloroform, and hot benzene.

(f) *Preparation of N-trityl-L-asparaginyl-S-trityl-L-cysteinyl-L-prolyl-L-leucyl glycine methyl ester.*—A mixture of 6.8 g. of the diethylamine salt of N-trityl-L-asparagine, obtained according to Example 1e, 2.85 g. of N-trityl-L-asparagine, obtained according to Example 1c or 1d, 10 g. of the hydrochloride of S-trityl-L-cysteinyl-L-prolyl-L-leucyl glycine methyl ester obtained according to Velluz et al., Bull. Soc. Chim. 1956, p. 1464, and 100 cc. of methylene chloride is cooled to −10° C. and 4.8 g. of dicyclohexyl carbodiimide are added. The mixture is stirred for 5 hours whereby the temperature is allowed to rise slowly to 0° C. The precipitated dicyclohexyl urea is filtered off. The solvent is removed by distillation in a vacuum and the residue is dissolved in 15 cc. of alcohol and 150 cc. of ether. The resulting solution is washed successively with 30 cc. of 15% aqueous alcohol containing a small amount of hydrochloric acid, 30 cc. of 15% aqueous alcohol, and 30 cc. of 15% aqueous alcohol containing a small amount of ammonia, and finally four times with 15% aqueous alcohol, each time with 30 cc. thereof. In this manner the unreacted tetrapeptide ester is removed in the form of its hydrochloride and excess N-trityl-L-asparagine is removed by, and recovered from, the alkaline wash waters.

The alcoholic-ethereal solution is dried over sodium sulfate and is evaporated to dryness. The residue is dissolved in methylene chloride. The solution is washed with water and dried. After removal of the solvent by distillation, the residue is triturated with ether and the crystals are filtered with suction. 14.1 g. (96% of the theoretical yield) of the pentapeptide compound are obtained. It has a rotatory power of $[\alpha]_D^{20} = -77° \pm 2°$ (concentration: 1% in chloroform), is insoluble in water and ether, slightly soluble in benzene, and soluble in alcohol, acetone, and chloroform.

*Analysis.*—$C_{59}H_{64}O_7N_6S = 1,001.2$. Calculated: 70.8% C; 6.4% H; 8.4% N; 3.2% S. Found: 70.6% C; 6.5% H; 8.3% N; 3.8% S.

(g) *Preparation of the hydrochloride of L-asparaginyl-S-trityl-L-cysteinyl-L-propyl-L-leucyl glycine methyl ester.*—13.9 g. of the N,S-ditrityl pentapeptide, obtained according to Example 1f, are treated with 14 cc. of acetic acid and 14 cc. of N hydrochloric acid at 40° C. for ten minutes. The mixture is diluted with 140 cc. of water and precipitated triphenylcarbinol is filtered off. 20 g. of ammonium chloride are added to the filtrate which is then extracted by means of methylene chloride. After evaporation to dryness, the crude product is washed with ether and purified by dissolving it in 10 cc. of methylene chloride and precipitating with 100 cc. of ether. 10.6 g. (96% of the theoretical yield) of the desired product are obtained. The compound has a rotatory power of $[\alpha]_D^{20} = -23° \pm 2°$ (concentration: 1% in chloroform), is insoluble in ether and benzene, and soluble in water, alcohol, acetone, and chloroform.

(h) *Preparation of (N-trityl-L-glutaminyl)-L-asparaginyl-(S-trityl-L-cysteinyl)-L-prolyl - L - leucyl glycine methyl ester (Formula I).*—10.6 g. of the hydrochloride of the S-trityl pentapeptide ester, obtained as described in Example 1g, are subjected to the action of 6 g. of the diethylamine salt of N-trityl glutamine, 5.1 g. of N-trityl glutamine, and 5.3 g. of dicyclohexyl carbodiimide in 100 cc. of methylene chloride at −10° C. for 45 hours. The reaction mixture is worked up as described in Example 1f and the crude reaction product is fractionated by dissolving it in a mixture of alcohol and ether (1:9) and washing the resulting solution successively with 15% aqueous alcohol acidified with hydrochloric acid, with 15% aqueous alcohol, and with 15% aqueous alcohol containing small amounts of ammonia as it is described in Example 1f. Finally, 12.1 g. of the desired compound are obtained. It is purified by recrystallization from a mixture of methanol and ether (1:5). The yield is 10.8 g. (72% of the theoretical yield). The compound has a rotatory power of $[\alpha]_D^{20} = -35° \pm 2°$ (concentration: 1% in chloroform).

10% of the hydrochloride of the pentapeptide used as starting material can be recovered from the acidic extraction solutions whereby the yield, calculated for reacted pentapeptide compound, is increased to 82%.

The compound is insoluble in water and ether, slightly soluble in benzene, and soluble in alcohol, acetone, and chloroform.

*Analysis.*—$C_{64}H_{72}O_9N_8S = 1,129.35$. Calculated: 68.1% C; 6.4% H; 9.9% N. Found: 67.7% C; 6.4% H; 9.8% N.

(i) *Preparation of the L-glutaminyl-L-asparaginyl-(S-trityl-L-cysteinyl)-L-prolyl-L-leucyl glycine methyl ester (Formula II).*—9.6 g. of the ditrityl hexapeptide of Formula I, obtained according to the preceding example, are dissolved in 8 cc. of lukewarm acetone. After the addition of 8 cc. of acetic acid, 9.5 cc. of N hydrochloric acid are added gradually within one minute. The mixture is allowed to stand for 15 minutes at a temperature of 25–28° C. After the addition of 140 cc. of water, the mixture is extracted three times with 40 cc. of ether, the combined ethereal extracts are again extracted successively with 20 cc., 10 cc., and 5 cc. of water, and the combined aqueous wash waters are extracted with 10 cc. of ether. The aqueous solutions are combined and 50 cc. of methylene chloride and then 20 g. of ammonium chloride are added thereto. The two layers are separated by decanting and the aqueous layer is once more extracted with 20 cc. and then with 10 cc. of methylene chloride. The methylene chloride extracts are combined, dried over sodium sulfate and evaporated to dryness in a vacuum. The residue is triturated with 20 cc. of ether and the crystals are filtered with suction, washed with ether, and dried. 7.6 g. of a crude product are obtained which is purified by dissolution in 7.5 cc. of methylene chloride and precipitation with 100 cc. of ether. The precipitate is filtered with suction, washed with ether, and dried. The yield is 7.45 g. (94% of the theoretical yield) of the hydrochloride of L-glutaminyl-L-asparaginyl-(S-trityl-L-cysteinyl)-L-prolyl-L-leucyl-glycine methyl ester of Formula II. The compound has a rotatory power of $[\alpha]_D^{20} = -24° \pm 2°$ (concentration: 1% in chloroform). It forms a colorless powder which is insoluble in ether, slightly soluble in benzene, and soluble in alcohol, acetone, and chloroform.

The compound has not yet been described in the literature.

EXAMPLE 2

*Preparation of the L-Glutaminyl-L-Asparaginyl-(S-Trityl-L-Cysteinyl)-L-Prolyl-L-Leucyl Glycine Methyl Ester (Formula II) (Method B)*

(a) *Preparation of the diethylamine salt of N-trityl-L-glutamine.*—60 g. of N-trityl-L-glutamic acid-γ-monomethyl ester prepared according to Amiard et al., Bull. Soc. Chim., 1956, page 97, are dissolved in 200 cc. of ammonia and 110 cc. of methanol. The solution is cooled to −10° C. and saturated by passing a stream of ammonia therethrough. The reaction mixture is allowed to stand at room temperature under pressure for 65 hours. Ammonia and the methanol are removed from the reaction mixture by distillation in a vacuum at a temperature below 40° C. and the oily residue is dissolved in 200 cc. of chloroform. The solution is stirred at 0° C. with 13 cc. of concentrated hydrochloric acid and then with 150 cc. of N-hydrochloric acid. The chloroform solution is then washed with water, dried, and evaporated to dryness at a temperature below 30° C. The residue is dissolved in 200 cc. of ethyl acetate. When adding 15 cc. of diethylamine, 67 g. (89% of the theoretical amount) of the diethylamine salt of N-trityl-L-glutamine are precipitated. The crude compound is recrystallized from ethyl acetate. The resulting pure compound crystallizes in the form of needles containing solvent of crystallization which melt at 112–114° C., have a rotatory power of $[\alpha]_D^{20} = +12° \pm 2°$ (concentration: 2% in chloroform), and are insoluble in ether, slightly soluble in cold alcohol, and soluble in water, hot alcohol, chloroform, ethyl acetate and benzene.

*Analysis.*—$C_{28}H_{35}N_3O_3, \frac{1}{2}CH_3CO_2C_2H_5 = 505.6$. Calculated: 71.3% C; 7.8% H; 12.7% O; 8.3% N. Found: 71.4% C; 7.7% H; 12.8% O; 8.4% N.

The compound has not yet been described.

(b) *Preparation of the hydrochloride of L-asparagine benzyl ester.*—A rapid stream of gaseous hydrochloric acid is passed through a suspension of 14 g. of N-trityl-L-asparagine benzyl ester, obtained according to Example 1b, in 42 cc. of chloroform. First solution takes place and then the hydrochloride precipitates. After standing for 5 minutes at room temperature, 150 cc. of ether are added and the precipitate is separated by filtration. It is recrystallized from a mixture of methanol and ethyl acetate (1:1). The yield is 92% of the theoretical amount. The compound melts at 125° C., has a rotatory power of $[\alpha]_D^{25} = 0° \pm 1°$ (concentration: 2% in water), and is insoluble in ether, slightly soluble in acetone, benzene, and chloroform, and soluble in water and alcohol.

*Analysis.*—$C_{11}H_{15}O_3N_2Cl = 258.7$. Calculated: 51.1% C; 5.8% H; 10.8% N; 13.7% Cl. Found: 51.4% C; 5.9% H; 10.3% N; 13.8% Cl.

The compound is new.

(c) *Preparation of N-trityl-L-glutaminyl-L-asparagine benzyl ester.*—2.6 g. of the diethylamine salt of N-trityl-L-glutamine, obtained according to the preceding Example 2a, are heated in 30 cc. of methylene chloride with 5.1 cc. of N hydrochloric acid. The methylene chloride solution is decanted and dried over sodium sulfate. 2.4 g. of the diethylamine salt of N-trityl-L-glutamine and 1.3 g. of the hydrochloride of L-asparagine benzyl ester, prepared according to the preceding Example 2b, are added to the resulting solution of N-trityl-L-glutamine and condensation is effected at −10° C. by the action of 2.2 g. of dicyclohexyl carbodiimide as described in the preceding examples. The reaction mixture is worked up as described hereinabove and the crude reaction product is taken up with 10 cc. of benzene and 5 cc. of water. It crystallizes in the form of a hydrate. The yield is 70% of the theoretical amount. The crude compound is recrystallized from aqueous ethoxy ethanol and then from a mixture of ethyl acetate and petroleum ether (1:9). The compound melts at 170° C., has a rotatory power of $[\alpha]_D^{25} = -5.5° \pm 1°$ (concentration: 1% in absolute alcohol), and is insoluble in water, slightly soluble in ether and benzene, and soluble in alcohol, acetone, and chloroform.

*Analysis.*—$C_{35}H_{36}O_5N_4 = 592.7$. Calculated: 70.9% C; 6.1% H; 13.5% O; 9.45% N. Found: 71.0% C; 6.2% H; 13.7% O; 9.6% N.

The compound has not yet been described in the literature.

(d) *Preparation of the diethylamine salt of N-trityl-L-glutaminyl-L-asparagine.*—1 g. of N-trityl-L-glutaminyl-L-asparagine benzyl ester, obtained according to the preceding Example 2c, is hydrogenolyzed in 20 cc. of 95% ethanol in the presence of 0.2 g. of palladium precipitated on 0.5 g. charcoal and 0.2 cc. of diethylamine. The catalyst is separated by filtration and the solvent is evaporated. The resulting crude diethylamine salt of N-trityl-L-glutaminyl-L-asparagine can be used as such for the next reaction step.

(e) *Preparation of (N-trityl-L-glutaminyl)-L-asparaginyl-(S-trityl-L-cysteinyl)-L-prolyl-L-leucyl - L - glycine methyl ester (Formula I)*.—2.9 g. of the crude diethylamine salt of (N-trityl-L-glutaminyl)-L-asparagine, obtained according to the preceding Example 2d, are treated in 20 cc. of methylene chloride with 5 cc. of N hydrochloric acid. The methylene chloride solution is decanted and dried over sodium sulfate. 5.75 g. of the crude diethylamine salt of (N-trityl-L-glutaminyl)-L-asparagine and 6.81 g. of the hydrochloride of the (S-trityl-L-cysteinyl)-L-prolyl-L-leucyl glycine methyl ester are dissolved in said solution. After cooling to −10° C., 3.2 g. of dicyclohexyl carbodiimide are added and the solution is allowed to stand at −10° C. overnight. Dicyclohexyl urea is filtered off, the filtrate is evaporated to dryness in a vacuum, and the residue is dissolved in 20 cc. of absolute alcohol. After the addition of 200 cc. of ether, the solution is washed six times with 30 cc. of 15% aqueous alcohol whereby the first wash liquid contains 5 cc. of N hydrochloric acid. The solution is then washed twice with 30 cc. of 15% aqueous alcohol containing 5 cc. of N ammonia. The washed ethereal-alcoholic solution is dried over sodium sulfate, concentrated by evaporation to sirupy consistency, and redissolved in 20 cc. of methylene chloride. The solution is washed with 50 cc. of water, dried over sodium sulfate, evaporated to dryness, triturated with ether, and filtered with suction. The resulting crude product is dissolved in 8 cc. of methanol and precipitated by the addition of 250 cc. of ether. Thereby 8.7 g. (80% of the theoretical yield) of N-trityl - L - glutaminyl - L - asparaginyl-(S-trityl-L-cysteinyl)-L-prolyl-L-leucyl glycine methyl ester are obtained which compound is identical in all respects with the product obtained according to Example 1h.

The compound is converted into L-glutaminyl-L-asparaginyl-(S-trityl-L-cysteinyl)-L-prolyl-L-leucyl glycine methyl ester as described in Example 1i.

EXAMPLE 3

*Preparation of the (S,N-Ditrityl-L-Cysteinyl)-L-tyrosyl-L-Isoleucyl-L-Glutaminyl - L- Asparaginyl - (S-trityl-L-Cysteinyl)-L-Prolyl-L-Leucyl Glycine Methyl Ester (Formula IV)*

(a) *Preparation of the diethylamine salt of S,N-ditrityl-L-cysteine*.—480 cc. of ether and 80 cc. of diethylamine are introduced, together with a stream of nitrogen and while stirring, into a solution of 25 g. of L-cysteine hydrochloride, $[\alpha]_D^{25}=+5.5°$ (c.=1%, N-hydrochloric acid) in 480 cc. of water which has been cooled to 0° C. The solution is then cooled to −5° C. and, without interrupting stirring, 120 g. of trityl chloride are added. Stirring is continued for three hours and, after adding another 200 cc. of chloroform and decanting the aqueous phase, the organic phase is washed with 300 cc. of water and dried over magnesium sulfate. 100 cc. of alcohol containing 1 cc. of diethylamine are added, and the chloroform is removed by distillation. The addition of 100 cc. of ether to the alcohol solution thus obtained and filtration of the precipitate yields 55 g. of the diethylamine salt of S,N-ditrityl L-cysteine, $[\alpha]_D^{20}=+17\pm1$ (c.=2%, chloroform). The mother liquor provides a second yield which brings the total to 7 g.

(b) *Condensation of the diethylamine salt of S,N-ditrityl-L-cysteine with the hydrochloride of the L-tyrosine ethyl ester*.—A mixture consisting of 20 g. of the diethylamine salt of S,N-ditrityl-L-cysteine and 7.6 g. of the ethyl ester of L-tyrosine hydrochloride is dissolved in 100 cc. of methylene chloride, 6.7 g. of dicyclohexyl carbodiimide dissolved in 20 cc. of methylene chloride are added, the solution is allowed to stand at room temperature for two hours and is then heated to approximately 35° C. for two hours. 2 cc. of glacial acetic acid are added and the solution is allowed to stand at room temperature for thirty minutes. It is then filtered, the filtrate washed first with water while adding N-hydrochloric acid until the pH reading is 2, then with plain water, dried over magnesium sulfate, and evaporated to dryness in a vacuum. Upon recrystallizing the residue in 30 cc. of ether, 19.6 g. (83%) of the ethyl ester of S,N-ditrityl-L-cysteinyl L-tyrosinate are obtained, melting point, first 135° C. and then at 183° C. with intermediate resolidification, $[\alpha]_D^{20}=+77°\pm1$ (c.=2%, chloroform). This product, which has not been previously described, appears in the form of small, colorless, rectangular prisms, which are soluble in benzene and chloroform, sparingly soluble in alcohol and acetone, difficultly soluble in ether, and insoluble in water.

*Analysis.*—$C_{52}H_{48}O_4N_2S=796.98$. Calculated: 78.36% C; 6.07% H; 3.52% N; 4.02% S; 8.03% O. Found: 78.3% C; 6.0% H; 3.6% N; 4.0% S; 8.2% O.

(c) *Saponification of the (S,N-ditrityl-L-cysteinyl)-L-tyrosine ethyl ester*.—19 g. of the ethyl ester of (S,N-ditrityl L-cysteinyl) L-tyrosin, prepared according to the preceding example, are introduced into 80 cc. of methanol, 16 cc. of 3 N potassium hydroxide in methanol and 50 cc. of water are added, and the solution is refluxed for several minutes. After adding 600 cc. of water and, subsequently, 49 cc. of N-hydrochloric acid while stirring vigorously, the solution is three times extracted with each 300 cc. of ether. The ether extracts are combined and washed with water, dried over magnesium sulfate, and vacuum evaporated to dryness. The residue is crystallized in 20 cc. of ethanol and produces 14.9 g., or a yield of 82%, of (S,N-ditrityl L-cysteinyl) L-tyrosine, M.P.= 146–148° C., $[\alpha]_D^{20}=+87.5\pm1$ (c.=2%, chloroform). This new compound appears in form of small, colorless rectangular prisms soluble in chloroform, sparingly soluble in alcohol, ether, acetone, benzene, insoluble in water.

*Analysis.*—$C_{50}H_{44}O_4N_2S=768.93$. Calculated: 78.09% C; 5.77% H; 3.64% N; 4.17% S. Found: 78.1% C; 5.8% H; 3.8% N; 4.3% S.

(d) *Preparation of the triethylamine salt of (S,N-ditrityl-L-cysteinyl)-L-tyrosine*.—2 g. of (S,N-ditrityl-L-cysteinyl)-L-tyrosine, prepared according to the preceding example, are dissolved in 4 cc. of chloroform; 0.37 cc. of triethylamine and then 25 cc. of petroleum ether (30–75° C.) are added to the solution, which is centrifuged and decanted. Crystallization in ether produces 2.2 g. (97%) of the triethylamine salt of (S,N-ditrityl L-cysteinyl) L-tyrosine, $[\alpha]_D^{20}=+77°\pm1$ (c.=2%, chloroform).

(e) *Condensation of the triethylamine salt of (S,N-ditrityl-L-cysteinyl)-L-tyrosine with the hydrochloride of the L-isoleucine methyl ester*.—7.5 g. of the triethylamine salt of (S,N-ditrityl L-cysteinyl)-L-tyrosine and 1.7 g. of methyl L-isoleucine hydrochloride, prepared according to Smith, Spackman and Poglasse, J. Biol. Chem., 1952, 199, 803, are dissolved in 30 cc. of methylene chloride, 2.1 g. of dicyclohexyl carbodiimide dissolved in 10 cc. of methylene chloride are added, and the solution is allowed to stand at room temperature for three hours. 2 cc. of glacial acetic acid are added, the solution is allowed to stand at room temperature for thirty minutes and is then filtered and washed with water while adding N hydrochloric acid until the wash water has a pH of 2. The solution is then washed with plain water, dried over magnesium sulfate and vacuum evaporated to dryness. The residue is triturated with 20 cc. of petroleum ether (30–75° C.). Separating, washing with petroleum ether, and drying produces 7.7 g., or a quantitative yield, of the methyl ester of (S,N-ditrityl L-cysteinyl)-L-tyrosyl-L-isoleucine. This new compound appears in the form of a colorless powder soluble in most organic solvents, insoluble in petroleum ether.

(f) *Saponification of the (S,N-ditrityl-L-cysteinyl)-L-tyrosyl-L-isoleucine methyl ester.*—7.7 g. of the methyl ester of (S,N-ditrityl L-cysteinyl) L-tyrosyl-L-isoleucine, prepared according to the preceding example, are dissolved in 30 cc. of hot methanol. 6.2 cc. of 3 N potassium hydroxide in methanol and 19.5 cc. of water are added to the solution, which is then heated to boiling for five minutes. After addition of 230 cc. of water and 18 cc. of N-hydrochloric acid, the solution is extracted twice, each time with 300 cc. of ether, and the ether extract is dried over magnesium sulfate and vacuum evaporated to dryness.

The residue is dissolved in 20 cc. of acetone, filtered, and vacuum evaporated to dryness, resulting in an oil which hardens rapidly by trituration with water. Separating, washing with water, and vacuum drying produces 5.8 g. or a yield of 76% of (S,N-ditrityl-L-cysteinyl)-L-tyrosyl L-isoleucine of Formula III. This new compound appears in the form of a white powder that is soluble in alcohol, ether, acetone, benzene, and chloroform, insoluble in water. It melts at about 143–145° C., $[\alpha]_D^{20} = +50° \pm 1$ (c.=2%, ethanol).

*Analysis.*—$C_{56}H_{55}O_5N_3S = 882.08$. Calculated: 76.25% C; 6.28% H; 9.07% O; 4.7% N; 3.63% S. Found: 76.5% C; 6.3% H; 8.7% O; 4.4% N; 3.9% S.

(g) *Condensation of (S,N-ditrityl-L-cysteinyl)-L-tyrosyl-L-isoleucine of Formula III with L-glutaminyl-L-asparaginyl-(S-trityl-L-cysteinyl)-L-prolyl-L-leucyl glycine methyl ester of Formula II.*—4.3 g. of (S,N-ditrityl-L-cysteinyl)-L-tyrosyl-L-isoleucine, prepared according to the preceding Example 3f, are dissolved in 19.2 cc. of anhydrous chloroform containing 5% of triethylamine. The solution is cooled to −10° C. and 15 cc. of a chloroform solution containing 4% of chloro formic acid ethyl ester are added. The mixture is allowed to stand in the ice-box for 15 minutes. It is again cooled to −10° C. and 16 cc. of a chloroform solution containing 5% of trtiethylamine are added. The resulting solution is added to a solution of 3.7 g. of the hydrochloride of the L-glutaminyl - L - asparaginyl - (S - trityl - L - cysteinyl)-L-prolyl--L-leucyl glycine methyl ester, prepared according to Example 1 or 2, in 14 cc. of distilled water. The mixture is stirred at room temperature for one hour and the chloroform is removed therefrom by distillation in a vacuum. After the addition of 20 cc. of alcohol and 200 cc. of ether, the mixture is washed six times with 50 cc. of 15% aqueous alcohol, the first washing being made with the addition of 10 cc. of N hydrochloric acid. The alcoholic-ethereal solution is dried over sodium sulfate and concentrated by evaporation to sirupy consistency. Said sirupy residue is dissolved in 40 cc. of methylene chloride. The resulting solution is washed with 50 cc. of water. After drying over sodium sulfate, the methylene chloride solution is evaporated to dryness in a vacuum. The residue is triturated with 100 cc. of ether, the remaining crystals are filtered with suction, washed with ether, and dried at 50° C. 5.5 g. of a crude product are obtained which is dissolved in 10 cc. of ethyl acetate and reprecipitated by the addition of 100 cc. of ether. Thereby, 4.2 g. (60% of the theoretical yield) of the desired tritylated nonapeptide ester of Formula IV are obtained.

The compound, which is new, has a rotatory power of $[\alpha]_D^{20} = 0° \pm 2°$ (concentration: 1% in chloroform) and forms a colorless powder which is insoluble in ether and acetone, slightly soluble in benzene, and soluble in alcohol and chloroform.

*Analysis.*—$C_{101}H_{111}O_{13}N_{11}S_2 = 1,751.14$. Calculated: 69.27% C; 6.39% H; 8.79% N. Found: 69.3% C; 6.5% H; 8.3% N.

EXAMPLE 4

*Preparation of (S,N-Ditrityl-L-Cysteinyl)-L-tyrosyl-L-Isoleucyl - L - Glutaminyl - L - Asparaginyl - (S - Trityl-L-Cysteinyl)-L-Prolyl-L-Leucyl Glycinamide (Formula V)*

1.2 g. of the trityl nonapeptide diamide ester compound of Formula IV, obtained according to the preceding example, are dissolved in 12 cc. of methanol. The solution is cooled to −10° C., saturated with dry ammonia, and allowed to stand in a hermetically sealed container at room temperature overnight. After cooling to −10° C., the container is opened and methanol and ammonia are removed by distillation in a vacuum. The residue is dissolved in 5 cc. of ethanol, whereafter 10 cc. of ether, 10 cc. of 15% aqueous alcohol, 40 cc. of ether, and two drops of aqueous N ammonia solution are added. After stirring, the two layers are separated by decanting and the ethereal solution is washed three more times in the same way. The washed ethereal solution is dried over sodium sulfate and evaporated in a vacuum to sirupy consistency. The residue is dissolved in 10 cc. of methylene chloride. The solution is washed with 20 cc. of water, dried over sodium sulfate, and evaporated to dryness in a vacuum. The resulting residue is triturated with 20 cc. of ether, filtered with suction, and dried. 850 mg. of a crude product are obtained which is dissolved in 1 cc. of lukewarm methanol and reprecipitated by the addition of 20 cc. of ether. The yield of the final product is 800 mg. (66% of the theoretical yield). The resulting (S,N - ditrityl - L - cysteinyl) - L - tyrosyl - L - isoluecyl-L - glutaminyl - L - asparaginyl - (S - trityl - L - cysteinyl)-L-prolyl-L-leucyl glycinamide of Formula V is identical in all respects with the compound described in copending application Serial No. 649,520, filed on March 29, 1957, now U.S. Patent No. 2,938,891, and entitled "Method of Making Oxytocin and Intermediates Thereof."

EXAMPLE 5

*Preparation of Oxytocin*

(S,N - ditrityl - L - cysteinyl) - L - tyrosyl - L - isoleucyl-L - glutaminyl - L asparaginyl - (S - trityl - L - cysteinyl)-L-prolyl-L-leucyl glycinamide of Formula V, obtained according to the preceding example, is detritylated by subjecting said compound to the action of gaseous hydrochloric acid in solution in anhydrous chloroform as well as in anhydrous chloroform containing acetic acid. In place of said chloroform solution, there can also be used a solution of gaseous hydrochloric acid in methylene chloride which may contain thioglycolic acid. Detritylation may also be carried out by stirring the methylene chloride solution of compound V with concentrated aqueous hydrochloric acid in the presence or in the absence of an inorganic salt, such as ammonium chloride, sodium chloride, and the like. Following, these methods are described more in detail:

(a) *Detritylation by means of gaseous hydrochloric acid in anhydrous chloroform.*—0.173 g. of the tri-tritylated nonapeptide triamide, V, prepared according to Example 4, are dissolved in 17 cc. of anhydrous chloroform. The solution is saturated with dry gaseous hydrochloric acid and, after standing for five minutes, the resulting precipitate is separated, washed with ether, and dissolved in 5 cc. of ice water. The pH of the aqueous solution is adjusted to a pH between 6.0 and 7.0 by shaking with a small amount of ion exchange resin sold under the trademark "Amberlite IR 4B." The resin is filtered off and washed with 5 cc. of water which is added to the filtrate. 10 cc. of a solution containing 0.1 g. of L-cysteinyl - L - tyrosyl - L - isoleucyl - L - glutaminyl - L-asparaginyl-L-cysteinyl-L-prolyl-L-leucyl glycinamide are obtained, which can be oxidized directly to the hormonal nonapeptide compound of du Vigneaud.

(b) *Detritylation with gaseous hydrochloric acid in chloroform containing acetic acid.*—0.173 g. of the tri-tritylated nonapeptide triamide, V, are dissolved in 1.7 cc. of chloroform and 0.8 cc. of glacial acetic acid. The solution is saturated with dry gaseous hydrochloric acid and processed as described in the preceding example.

(c) *Detritylation with gaseous hydrochloric acid in methylene chloride, in the presence of thioglycolic acid.*— A solution of 0.173 g. of the tri-tritylated nonapeptide triamide, V, in 17 cc. of methylene chloride containing 0.5 cc. of thioglycolic acid is used as starting material. Otherwise, the procedure is the same as described in Example 5a.

(d) *Detritylation with aqueous hydrochloric acid in methylene chloride.*—0.2 g. of the tri-tritylated nonapeptide triamide, V, are dissolved in 5 cc. of methylene chloride, and the resulting solution is shaken for 15 minutes with 1 cc. of 10 N aqueous hydrochloric acid. 50 cc. of water are added, the organic layer is removed and the aqueous layer washed with methylene chloride. Adjusting the pH to between 6.0 and 7.0 by shaking with a small amount of ion exchange resin sold under the trademark "Amberlite IR 4B," filtering, and making up the filtrate to 100 cc. produces a solution containing L-cysteinyl-L-tyrosyl-L-isoleucyl-L-glutaminyl - L - asparaginyl-L-cysteinyl-L-prolyl-L-leucyl glycinamide which can be directly oxidized to yield the hormonal nonapeptide compound of du Vigneaud.

The resulting solution of L-cysteinyl-L-tyrosyl-L-isoleucyl-L-glutaminyl-L-asparaginyl - L - cysteinyl-L-prolyl-L-leucyl glycinamide is immediately oxidized by stirring it in an oxygen atmosphere until a test sample gives a negative color reaction upon addition of sodium nitroprusside and ammonia. The resulting solution shows an oxytocic activity of about 100 I.U. to 150 I.U. per mg. of detritylated compound, determined by the reduction of the blood pressure in chicken according to the method of Coon, "Arch. Intern. Pharmacodynamie," 1939, vol. 62, page 79; U.S. Pharmacopeia, 15th ed., 1955, p. 494.

We claim:

1. A process of producing oxytocin which comprises the steps of treating a solution of (N-trityl-L-glutaminyl)-L-asparaginyl-(S-trityl-L-cysteinyl)-L - prolyl - L - leucyl glycine methyl ester with aqueous hydrochloric acid and acetic acid in a solvent selected from the group consisting of acetone and chloroform, to selectively split off the N-trityl group, reacting the resulting L-glutaminyl-L-asparaginyl - (S-trityl-L-cysteinyl) - L - prolyl - L - leucyl glycine methyl ester with the mixed anhydride of (N,S-ditrityl-L-cysteinyl)-L-tyrosyl-L-isoleucine and ethyl carbonic acid, treating the resulting (N,S-ditrityl-L-cysteinyl) - L-tyrosyl-L-isoleucyl-L-glutaminyl-L-asparaginyl-(S-trityl-L-cysteinyl) - L - prolyl-L-leucyl glycine methyl ester overnight with dry ammonia, detritylating the resulting amide by treating the same with an acid agent selected from the group consisting of gaseous hydrochloric acid in chloroform, gaseous hydrochloric acid in a mixture of chloroform and acetic acid, gaseous hydrochloric acid in a mixture of methylene chloride and thioglycolic acid, and aqueous hydrochloric acid in methylene chloride, and oxidizing the detritylated compound to yield oxytocin.

2. The process according to claim 1, wherein selective splitting off of the N-trityl group of the (N-trityl-L-glutaminyl)-L-asparaginyl-(S-trityl-L-cysteinyl)-L-prolyl-L-leucyl glycine methyl ester by means of hydrochloric acid is carried out in a mixture of acetone and acetic acid.

3. The process according to claim 1, wherein condensation of the mixed anhydride of (N,S-ditrityl-L-cysteinyl)-L-tyrosyl-L-isoleucine and ethyl carbonic acid with L-glutaminyl-L-asparaginyl - (S-trityl-L-cysteinyl)-L-prolyl-L-leucyl glycine methyl ester is carried out in aqueous chloroform.

4. The process according to claim 1, wherein (N,S-ditrityl-L-cysteinyl) - L-tyrosyl-L-isoleucyl-L-glutaminyl-L-asparaginyl - (S-trityl-L-cysteinyl) - L-prolyl-L-leucyl glycine methyl ester is reacted with ammonia in methanol at a temperature between about —10° C. and room temperature.

References Cited in the file of this patent

Helferick et al.: Ber. Deut. Chem., vol. 58, p. 885 (1925).

Vaughan et al.: J.A.C.S., 74 (pages 676–8) (1952).

Hillmann-Elies: "Zeit. für Naturforschung," 8b (pages 445–6) (1953).

Du Vigneaud et al.: J. Am. Chem. Soc., vol. 76, p. 3115 (1954).

Boissonnas: Helv. Chimica Acta, vol. 38 (1955), pages 1491–1501.

UNITED STATES PATENT OFFICE
CERTIFICATE OF CORRECTION

Patent No. 3,076,797　　　　　　　　　　　　　　　　February 5, 1963

Leon Velluz et al.

It is hereby certified that error appears in the above numbered patent requiring correction and that the said Letters Patent should read as corrected below.

Column 2, formula I, the extreme upper right-hand portion of the formula, about line 14, for "$C_7H_5$" read -- $C_6H_5$ --; same column, formula IV, the upper left side portion of the formula, about lines 43, 44 and 45, for

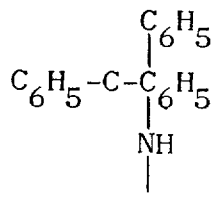　　　read　　　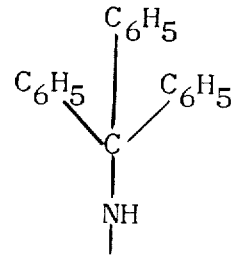

column 4, line 18, for "748,801" read -- 748,807 --; line 48, for "temperaure" read -- temperature --; same line 48, for "reacation" read -- reaction --; column 5, line 26, for "71" read -- 71% --; column 9, line 69, for "7 g." read -- 70 g. --; column 11, line 27, for "4.7%" read -- 4.76% --.

Signed and sealed this 17th day of September 1963.

(SEAL)
Attest:

ERNEST W. SWIDER　　　　　　　　　　　　　　　　DAVID L. LADD
Attesting Officer　　　　　　　　　　　　　　　　　Commissioner of Patents